(12) United States Patent
McLeod et al.

(10) Patent No.: US 8,092,115 B1
(45) Date of Patent: Jan. 10, 2012

(54) ENTRAPPED NUT

(75) Inventors: Gary McLeod, Flagstaff, AZ (US); Bill H. Fong, Sacramento, CA (US)

(73) Assignee: Cisco Technology, Inc., San Jose, CA (US)

( * ) Notice: Subject to any disclaimer, the term of this patent is extended or adjusted under 35 U.S.C. 154(b) by 530 days.

(21) Appl. No.: 12/172,296

(22) Filed: Jul. 14, 2008

(51) Int. Cl.
*H05K 5/00* (2006.01)

(52) U.S. Cl. .................. 403/408.1; 312/223.2; 411/180; 411/968; 361/724

(58) Field of Classification Search .................... 403/21, 403/22, 278, 408.1; 411/116, 166, 183, 172, 411/173, 174, 175, 176, 180, 181, 968; 211/189; 361/724; 312/265.1, 265.4, 223.1, 223.2
See application file for complete search history.

(56) References Cited

U.S. PATENT DOCUMENTS

| | | | |
|---|---|---|---|
| 1,873,869 A * | 8/1932 | Carr .............................. 411/183 |
| 2,146,128 A * | 2/1939 | Oldham ........................ 411/173 |
| 2,562,336 A | 7/1951 | Selden |
| 3,008,554 A * | 11/1961 | Hodgson ........................ 403/21 |
| 3,125,146 A * | 3/1964 | Rosan ........................... 411/180 |
| 3,229,790 A | 1/1966 | Shayne |
| 3,270,355 A * | 9/1966 | Tildesley ...................... 411/176 |
| 5,022,804 A * | 6/1991 | Peterson ........................ 403/21 |
| 5,251,370 A * | 10/1993 | Muller et al. ................. 411/180 |
| 5,941,621 A * | 8/1999 | Boulay et al. ............. 312/334.4 |
| 6,622,873 B2 * | 9/2003 | Hegrenes et al. ............... 211/26 |
| 6,930,886 B2 * | 8/2005 | Velez et al. ................... 361/724 |
| 7,334,958 B2 | 2/2008 | Muller |
| 7,927,051 B2 * | 4/2011 | Lv ................................. 411/180 |

\* cited by examiner

*Primary Examiner* — Michael P Ferguson

(74) *Attorney, Agent, or Firm* — Patent Capital Group

(57) ABSTRACT

An apparatus having a first panel and a second panel that may form part of a network enclosure. The first panel is connected to the second panel. A nut has a first portion and a second portion extending outwardly from the first portion. The second portion of the nut is trapped between the first panel and the second panel. There may also be a joining plate of a field replaceable unit fixable to the network enclosure by at least one bolt engaging the nut.

8 Claims, 6 Drawing Sheets

SECTION A-A

SECTION A-A

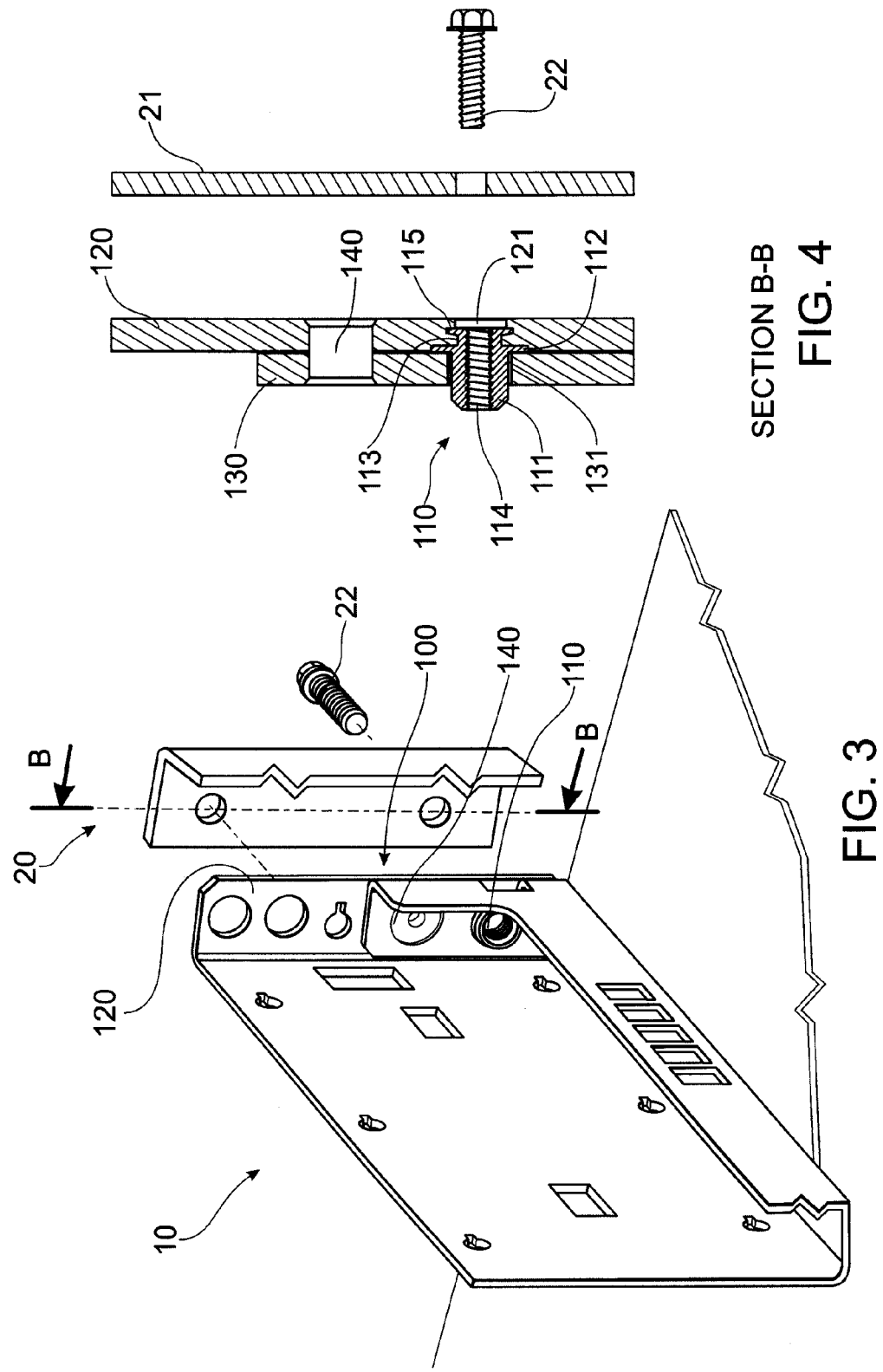

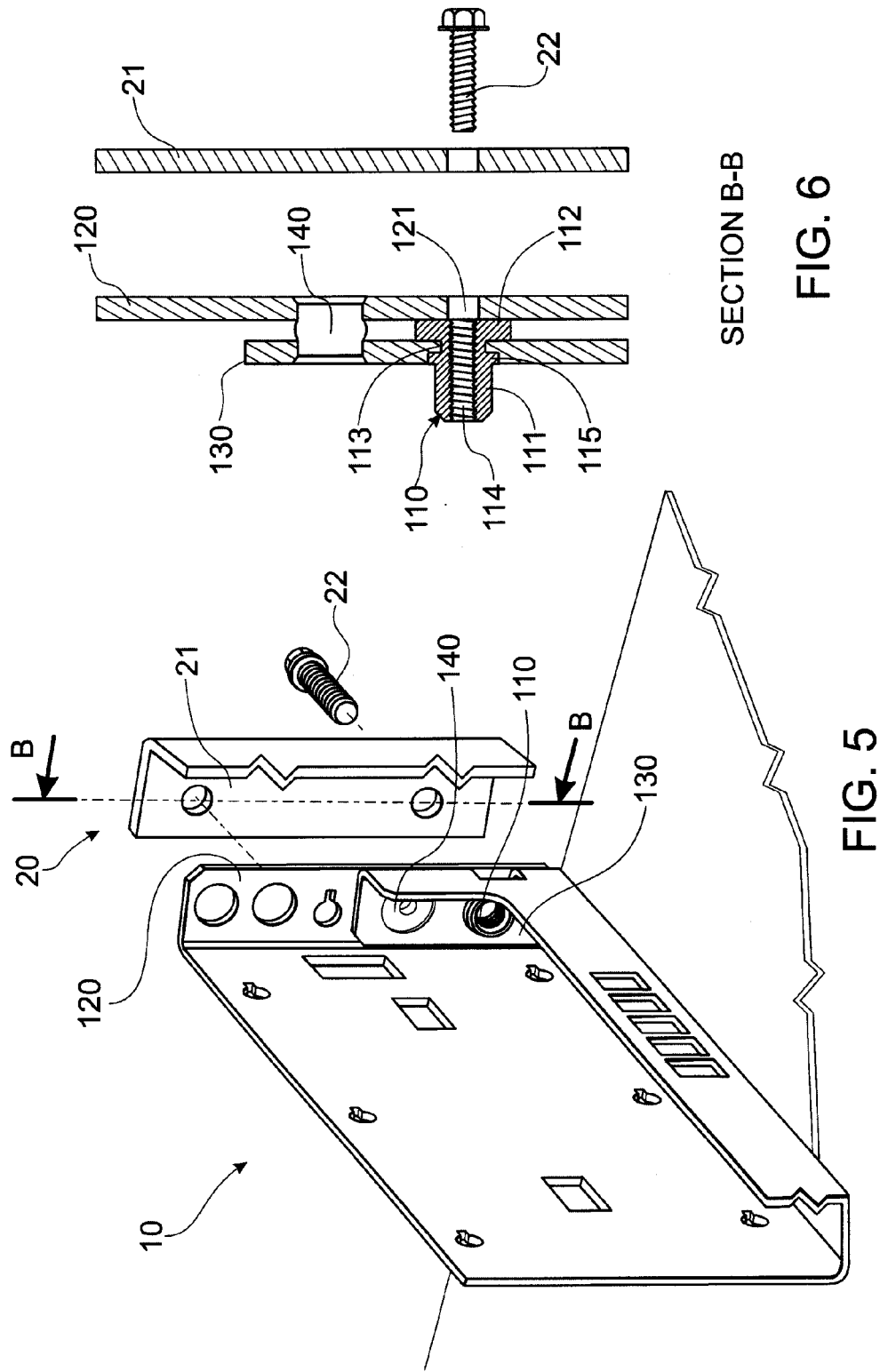

ENTRAPPED NUT

TECHNICAL FIELD OF THE INVENTION

The present disclosure relates generally to connecting mechanisms. In particular, the disclosure relates to entrapped nuts.

BACKGROUND

Local-area network (LAN) switches are at the core of all networks, providing high-speed connectivity, applications, and communications systems. One way in which networks switches have improved is their ability to have field replaceable units Field replaceable units allow any faulty unit to be replaced quickly and easily. Field replaceable units are secured to associated network enclosures through the use of a nut which is fastened to an internal panel of the enclosure and a bolt which passes through the field replaceable unit to be captured by the nut. The bolt is screwed tightly into the nut to secure the field unit to the associated network racking.

OVERVIEW

Embodiments described herein comprise an apparatus having a first panel and a second panel. The first panel is coupled to the second panel. There is also at least one nut that has a first portion and a second portion with the first portion of the nut extending outwardly from the second portion of the nut. The first portion of the nut is trapped between the first panel and the second panel.

BRIEF DESCRIPTION OF THE DRAWINGS

FIG. 3 illustrates a further example of part of an enclosure of a network device.

FIG. 4 illustrates a further example of a nut trapped between panels of the enclosure of FIG. 3.

FIG. 5 illustrates another example of part of an enclosure of a network device.

FIG. 6 illustrates another example of a nut trapped between panels of the enclosure of FIG. 5.

DESCRIPTION OF EXAMPLE EMBODIMENTS

Figures 1, 2:
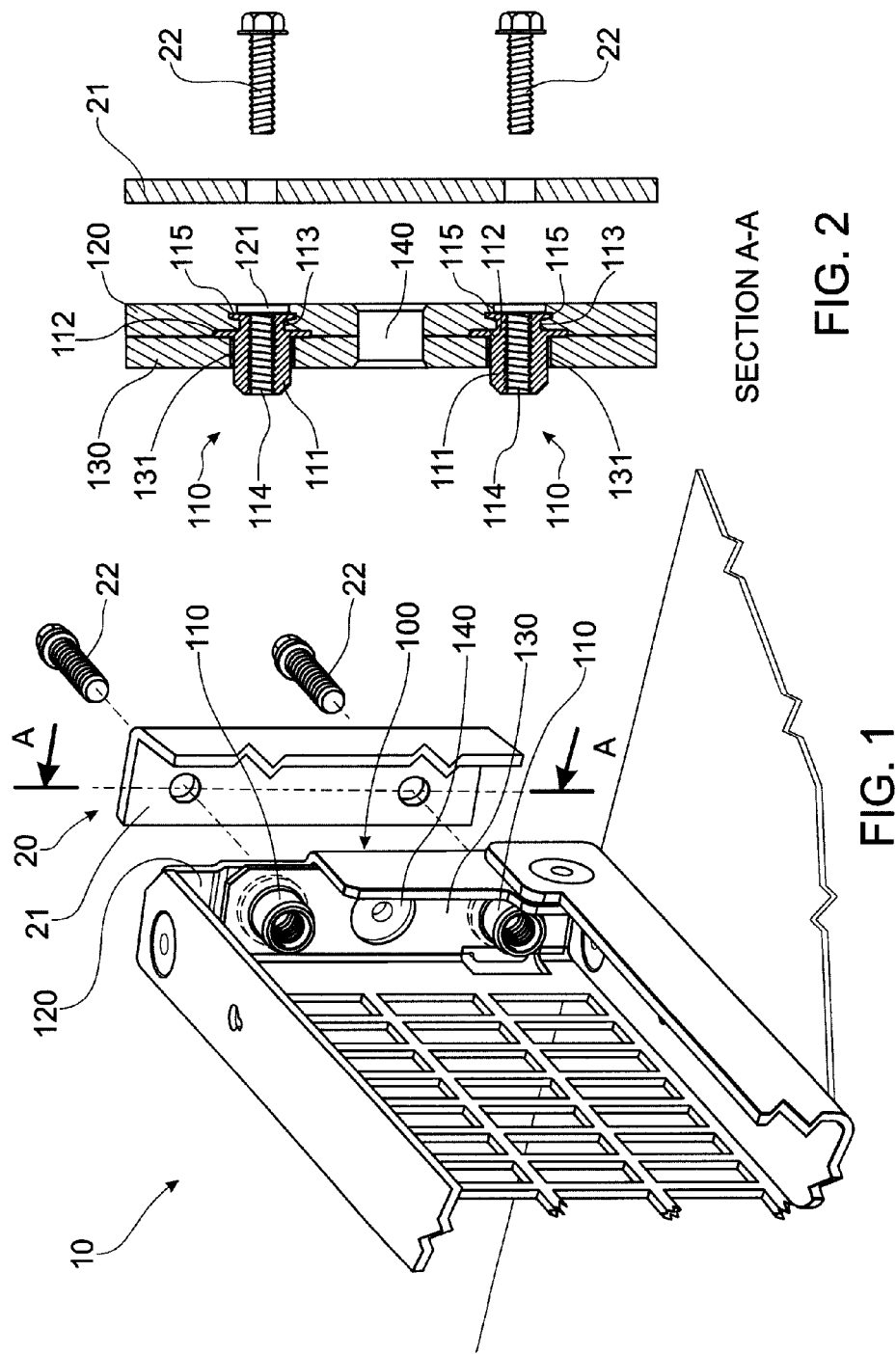
FIG. 1 illustrates an example of part of an enclosure of a network device.
FIG. 2 illustrates an example of a nut trapped between panels of the enclosure of FIG. 1.

Embodiments described herein will now be described with reference to the drawings, wherein like reference numerals are used to refer to like elements throughout.

FIG. 1 shows a perspective view of part of an enclosure that is part of a network device 10. The network device 10 may be electronic equipment used in a computing or communication environment and in particular will comprise an enclosure formed from a number of connected panels. A typical example network device may be a Cisco Catalyst 3750-E switch or similar device. The network device may include one or more field replaceable units such as those utilized in a Cisco Catalyst 3750-E switch. Field replaceable units may include power supplies, communications equipment, filters and the like, and will commonly be constructed as a rack that is bolted into the enclosure of the network device. Each field replaceable unit may include a joining portion 20 that includes a joining plate 21 and associated attachment bolts 22.

According to one embodiment, an apparatus 100 may formed within the network device 10 for attachment of a field replaceable unit. The apparatus 100 may include a nut 110, a first panel 120 and a second panel 130.

In the embodiment of FIG. 1 and FIG. 2 the apparatus 100 includes two nuts 110. Each of the nuts 110 may be an industry standard clinch nut. It should be appreciated that various clinch nuts may be used. The nut 110 has a first portion 111 and a second portion 112 as shown more clearly in FIG. 2. The second portion 112 extends outwardly from the first portion 111 such that an outer dimension of the second portion 112 is greater than a corresponding outer dimension of the first portion 111. An internal bore 114 extends through the nut 110 and is threaded. A recess 113 and lip 115 are located adjacent to the second portion 112.

In one embodiment, if nut 110 is cylindrically shaped, an outer dimension of first portion 111 may be a diameter of the first portion, and an outer dimension of the second portion may be a diameter of the second portion. For a generally cylindrical nut, the outer dimension may be a diameter, and the second portion 112 may be in the form of a flange. It should be appreciated that nut 110 is not limited to being cylindrically shaped. In general, a nut may be of substantially any shape. By way of example, a nut may be polygonally shaped. An outer dimension of a nut that is polygonally shaped may be the largest distance between any pair of vertices of the polygon, or the longest polygon diagonal associated with the nut. The longest polygon diagonal, or the longest line segment joining two vertices, is effectively the diameter of the polygon. For a nut having, for example, a square hexagonal or octagonal cross-sectional shape, the dimension may be the length of the longest or major square hexagonal or octagonal diagonal.

The first panel 120 is suitably manufactured so that it is able to easily contact the joining plate 21 of the joining portion 20 of a field replaceable unit. The first panel 120 has at least one hole 121 that extends through the first panel 120. In the embodiment of FIG. 1 and FIG. 2 there are two holes 121. The holes 121 have an inner dimension so that the attachment bolt 22 of a field replaceable unit is able to easily pass through the first panel 120 to engage the thread 114 of the nut 110, but the second portion 112 cannot pass through the hole 121.

The second panel 130 abuts and is connected to the first panel 120. The first panel 120 and the second panel 130 may be connected by, for example, a rivet 140. However, it should be appreciated that rivets are only one type of fastening of the panels that can be used. For example, the panels may be connected to each other by spot welds or nuts and bolts.

In the embodiment of FIG. 1 and FIG. 2 the second panel 130 has two holes 131 that extend through the second panel 130. The holes 131 have an inner dimension so that the first portion 111 of the nut 110 is able to pass through the respective holes 131 but the second portion 112 cannot pass through the holes 131.

Both the first panel 120 and the second panel 130 may be made from sheet metal that is cut and folded to a desired shape. It should be appreciated that the shape of the first panel 120 and second panel 130 are for illustrative purposes only and other panels of various shapes and sizes may be used.

In the embodiment of FIG. 1 and FIG. 2 the nuts are clinched within the holes 121 of the first panel 120 by clinching the first panel 121 in the recess 113 between the lip 115 and the second portion 112. The clinching of the nuts 110 to the first panel 120 prevents the nuts 110 from rotating.

The second panel 130 may then be fastened to the first panel 120 such that the first portion 111 of the respective nut 110 extends through the second panel 130. Accordingly, the second portion 112 of each of the nuts 110 is trapped between the first panel 120 and the second panel 130 as shown in FIG. 2.

In use, the bolt 22 is passed through each hole 121 in the first panel 120 and into the bore 114 of a respective nut 110. The bolt 22 is tightened until the joining plate 21 of the field replaceable unit is held fast against the first panel 120.

The apparatus 100 provides an advantage that if a "pull out" or "push through" force is applied to the nut 110, the nut 110 is held in its original position. This is due to the second portion 112 of the nut 110 being entrapped between the first panel 120 and the second panel 130.

FIG. 3 and FIG. 4 show an example of the apparatus 100 formed with a different network device 10. In this example, the shapes of the first panel 120 and second panel 130 are different but the enclosure maintains the same general shape. Further, only a single nut 110 is utilized. However, the first panel 120 and the second panel 130 are still fastened via a rivet 140 or similar, and a second portion 112 of the nut 110 is still trapped between the first panel 120 and the second panel 130.

It should be appreciated that the shape of the nut 110 may be varied. In particular the shape and/or position of the second portion 112 may be of a different form. As in the embodiment of FIG. 1 and FIG. 2, the nut 110 is clinched to first panel 120 by capturing a portion of the first panel 120 in the recess 113 between the lip 115 and the second portion 112.

FIG. 5 and FIG. 6 show a further example of an apparatus 100 which uses a different clinch nut 110. In this example, the second portion 112 of the nut 10 is located adjacent at one end of the nut 110 with the recess 113 and lip 115 located along the first portion 111.

The nut 110, in this example, is clinched to the second panel 130. Again, the second portion 112 is located between the first panel 120 and the second panel 130 to trap the nut 110. The second panel 130 is clinched in the recess 113 between the lip 115 and the second portion 112. A bolt 22 may pass through the hole 121 in the first panel 120 and engage the thread 114 in the nut 110 so as to hold the joining plate 21 of the field replaceable unit against the first panel 120 when the bolt 22 is tightened.

Figure 8:
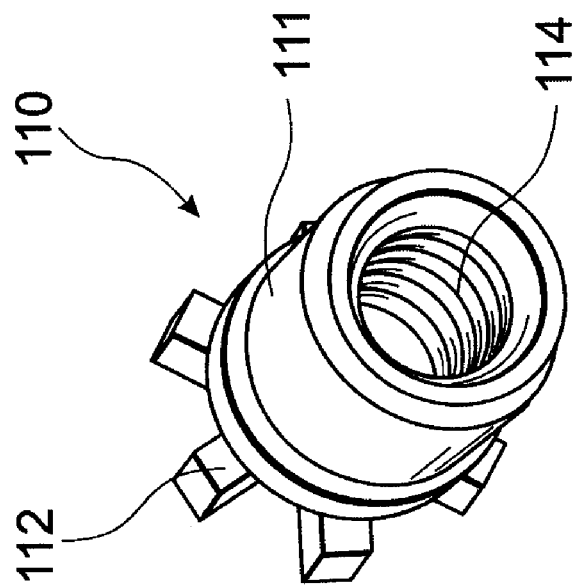
FIG. 8 illustrates a another alternative example of a nut that can be trapped between panels of an enclosure.
Figure 7:
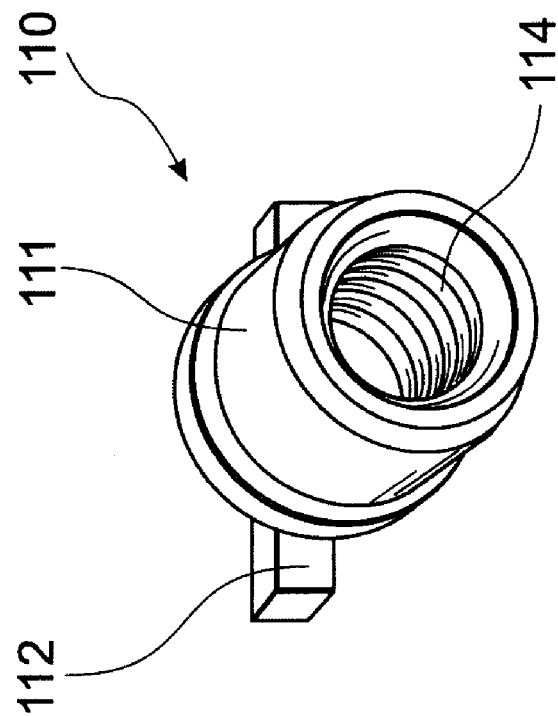
FIG. 7 illustrates an alternative example of a nut that can be trapped between panels of an enclosure.

FIG. 7 shows another embodiment of a nut 110 that has a second portion 112 in the form of two lugs that extend outwardly from the body 111. FIG. 8 shows a further embodiment of a nut 110 that has a second portion 112 formed from a series of lugs that extend outwardly from the body 111. Both of these alternate embodiments of nut 110 resist "pull out" and "push through" forces when the second portion 112 is trapped between the first panel 120 and the second panel 130.

Figure 9:
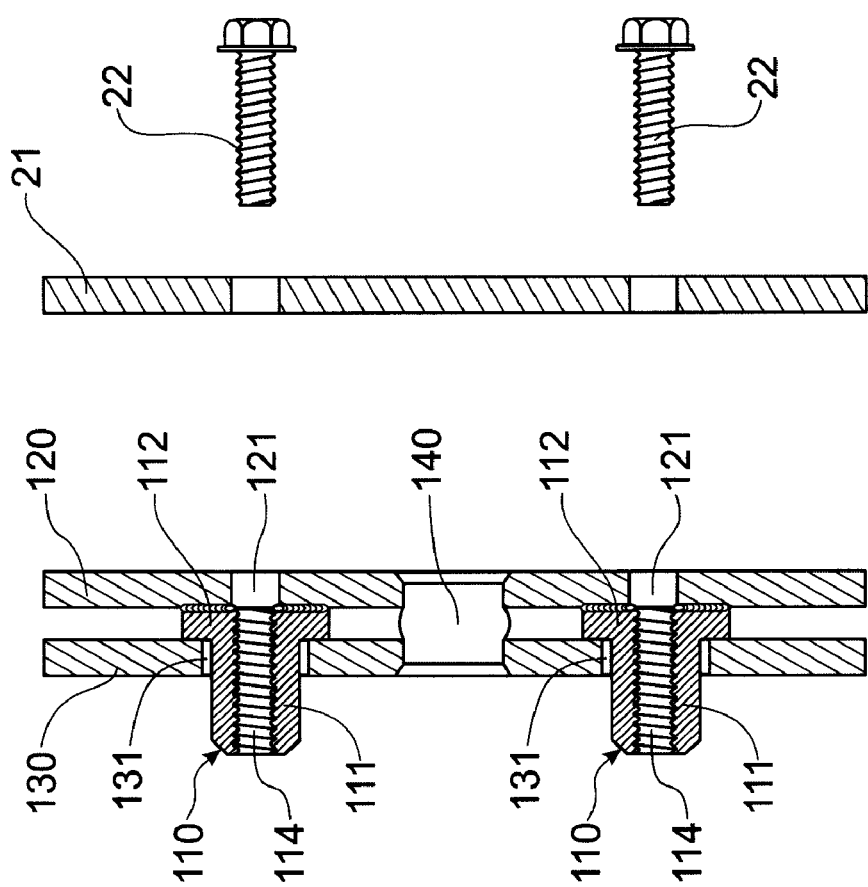
FIG. 9 illustrates a further example of a nut trapped between panels of an enclosure.

FIG. 9 shows the head 112 of another embodiment of a nut 110 attached to the first panel 120. In this example of the apparatus 100, the second portion 112 of the nut 110 is welded to the first panel 120 so that the nut 110 is trapped between the first panel 120 and the second panel 130 and will not rotate. However, the second panel 130 still abuts against the head 112 increasing the resistance of the nut 110 to "pull out" and "push through" forces.

Figure 11:
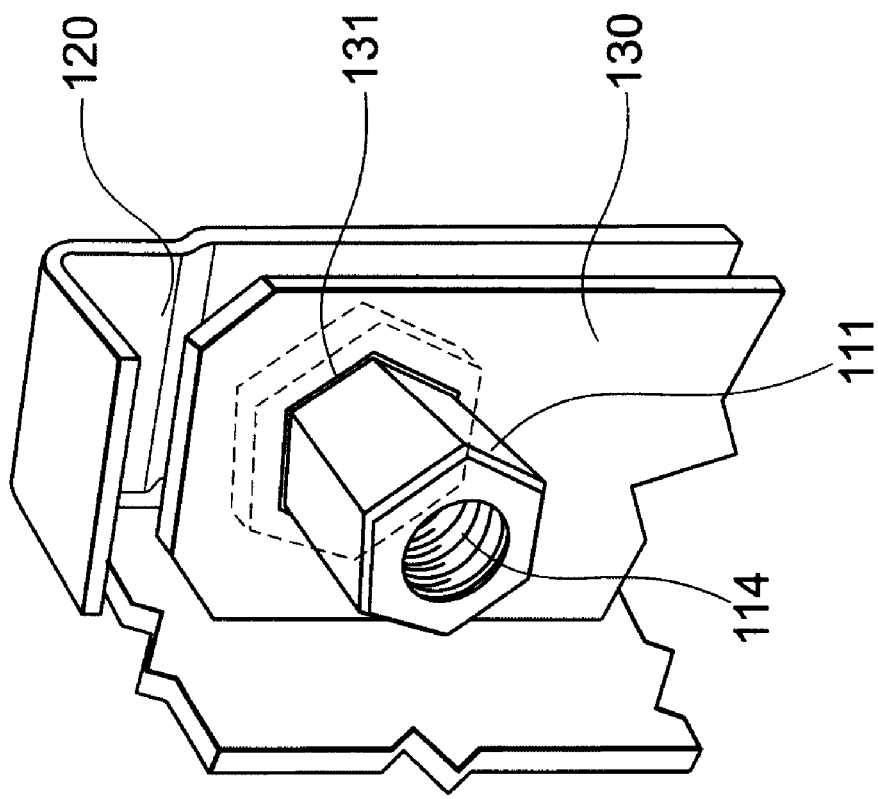
FIG. 11 illustrates an example of the nut of FIG. 9 trapped between panels of an enclosure.
Figure 10:
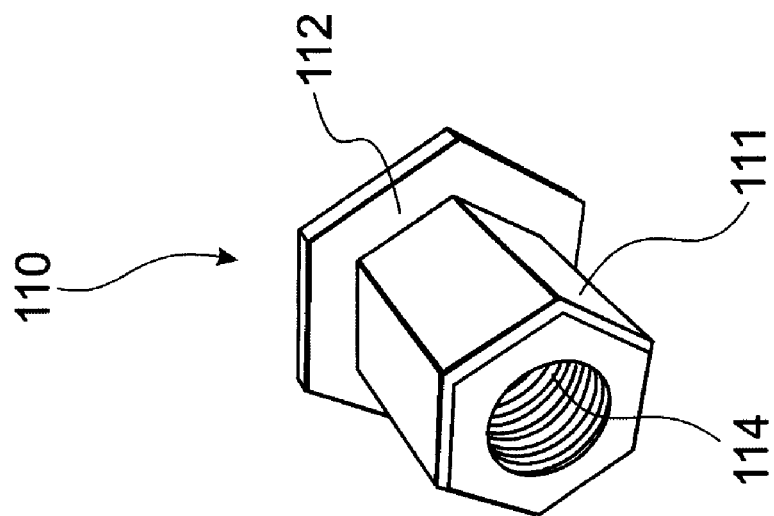
FIG. 10 illustrates yet another example of a nut that can be trapped between panels of an enclosure.

FIG. 10 and FIG. 11 illustrate yet another example of an apparatus 100 in which the nut 110 is not fastened to either the first panel 120 or the second panel 130. In this example, the second portion 112 of the nut 110 is trapped between the first panel 120 and the second panel 130 but the nut 110 is prevented from rotating by the first portion 111 of the nut 110 being hexagonally shaped and holes 131 in the second panel 130 being hexagonally shaped. The body 111 abuts the holes 131 of the nut 110 to prevent rotation of the nut 110. No physical fastening is required to the first panel 120 or the second panel 130. The second portion 112 increases the resistance of the nut 110 to "pull out" and "push through" forces.

It should be appreciated that the nut 110 may be attached to the first panel 120 or the second panel 130 or both the first panel 120 and the second panel 130 or to neither of the panels. If the nut 110 is attached to one of the first panel 120 and/or second panel 130 this is normally completed before the first panel 120 and the second panel 130 are fastened together.

The first panel 120 and the second panel 130 are typically fastened together with mechanical fasteners such as rivets, screws or nut and bolts. However, it should be appreciated that the first panel 120 and second panel 130 may be fastened together using other fastening methods such as welding or adhering.

The invention claimed is:

1. An apparatus comprising:
   a nut having a first substantially cylindrical portion, a second substantially cylindrical portion, a flange disposed between the first and second portions, and a threaded bore extending through each of the first portion, second portions, and the flange, and along central axes of the first and second substantially cylindrical portions, the first portion having a first outer radial dimension and the second portion having a second outer radial dimension, wherein the first and second portions are substantially coaxial sharing a central axis, and the flange has a shortest radial dimension extending beyond the first and second outer dimensions and in a plane normal to the central axis;
   a first panel having:
      a first hole defined therethrough, the first hole having a first inner radial dimension being smaller than the shortest radial dimension of the flange and adapted to at least partially receive the first portion of the nut; and
      a recess adapted to at least partially receive the flange;
   a second panel having a second hole defined therethrough, the second hole having a second inner radial dimension being smaller than the shortest radial dimension of the flange and adapted to at least partially receive the second portion of the nut;
   the second panel being fixedly connected to and substantially abutting the first panel so as to entrap the flange within the recess between the second panel and the first panel and prevent movement of the nut in directions parallel to the central axis relative the first and second joined panels;
   wherein the flange is disposed at a first end of the first portion and the nut has a radially outwardly protruding lip disposed at the other, second end of the of the first portion disposed within an interior of the first hole, the lip having a shortest outer radial dimension extending beyond the first outer radial dimension, the threaded bore extends through the lip, and the nut is clinched to the first panel by capturing a portion of the first panel between the lip and the flange;

wherein the threaded bore of the nut is adapted to receive a bolt passing through at least the first portion of the nut.

2. The apparatus of claim 1 wherein the flange is generally octagonal, hexagonal or square.

3. The apparatus of claim 1, wherein the apparatus forms part of an enclosure of a network device adapted to connect to field replaceable units.

4. The apparatus of claim 1, wherein the second outer dimension is larger than the first outer dimension.

5. A system comprising:
- a nut having a first substantially cylindrical portion, a second substantially cylindrical portion, a flange disposed between the first and second portions, and a threaded bore extending through each of the first portion, second portions, and the flange, the first portion having a first outer radial dimension and the second portion having a second outer radial dimension, wherein the first and second portions are substantially coaxial sharing a central axis, and the flange has a shortest radial dimension extending beyond the first and second outer dimensions and in a plane normal to the central axis;
- a first panel having:
  - a first hole defined therethrough, the first hole having a first inner radial dimension being smaller than the shortest radial dimension of the flange and adapted to at least partially receive the first portion of the nut; and
  - a recess adapted to at least partially receive the flange
- a second panel having a second hole defined therethrough, the second hole having a second inner radial dimension being smaller than the shortest radial dimension of the flange and adapted to at least partially receive the second portion of the nut;
- the second panel being fixedly connected to and substantially abutting the first panel so as to entrap the flange within the recess between the second panel and the first panel and prevent movement of the nut in directions parallel to the central axis, relative the first and second joined panel;
- wherein the flange is disposed at a first end of the first portion and the nut has a radially outwardly protruding lip disposed at the other, second end of the of the first portion disposed within an interior of the first hole, the lip having a shortest outer radial dimension extending beyond the first outer radial dimension, the threaded bore extends through the lip, and the nut is clinched to the first panel by capturing a portion of the first panel between the lip and the flange;
- a third panel having a third hole defined therethrough; and
- a bolt arranged to pass through the third opening and the first opening and to engage the threaded bore of the nut to hold the third panel to the first panel.

6. The system of claim 5 wherein the first panel and the second panel form part of an enclosure of a network device.

7. The system of claim 5 wherein the third panel forms part of a field replaceable unit for a network device.

8. The system of claim 5 wherein the first panel and the second panel form part of an enclosure of a network device and the third panel forms part of a rack of a field replaceable unit for the network device.

\* \* \* \* \*